US006692041B1

(12) United States Patent
Coulas, Sr.

(10) Patent No.: US 6,692,041 B1
(45) Date of Patent: *Feb. 17, 2004

(54) PIPING TO COMPONENT CONNECTOR

(75) Inventor: James J. Coulas, Sr., Chicago, IL (US)

(73) Assignee: Weldbend Corporation, Argo, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 493 days.

(21) Appl. No.: 08/944,817

(22) Filed: Oct. 6, 1997

(51) Int. Cl.$^7$ ................................................ F16L 23/00
(52) U.S. Cl. ...................................... 285/406; 138/109
(58) Field of Search ................................ 285/405, 406, 285/180, 368, 412, 420, 133.11, 133.6, 179, 363, 414, 416; 138/109.55

(56) References Cited

U.S. PATENT DOCUMENTS

| | | | | |
|---|---|---|---|---|
| 612,455 A | * | 10/1898 | Gore | 285/368 X |
| 672,034 A | * | 4/1901 | Cunningham | 285/363 |
| 1,178,714 A | * | 4/1916 | Griffin | 285/420 X |
| 1,193,483 A | * | 8/1916 | Parker | 285/420 X |
| 2,740,423 A | * | 4/1956 | Stillwagon | 285/363 X |
| 3,836,184 A | * | 9/1974 | Gregory | 285/420 X |
| 4,191,217 A | * | 3/1980 | Kadono et al. | 138/109 |
| 4,428,603 A | * | 1/1984 | Davlin | 285/412 X |
| 4,699,177 A | * | 10/1987 | Thomas | 138/109 X |
| 4,848,396 A | * | 7/1989 | Sisk | 285/133.11 X |
| 5,188,396 A | * | 2/1993 | Calvin | 285/179 X |
| 5,259,410 A | * | 11/1993 | Trueb et al. | 138/155 X |
| 5,387,017 A | * | 2/1995 | Gill | 285/420 X |
| 5,636,878 A | * | 6/1997 | Millward et al. | 285/414 X |
| 5,676,404 A | * | 10/1997 | Sisk | 285/133.11 |
| 5,799,702 A | * | 9/1998 | Hsien-Jen et al. | 138/155 X |
| 5,813,437 A | * | 9/1998 | Esser | 138/109 |

FOREIGN PATENT DOCUMENTS

GB 4583 * 7/1914 ................. 285/420

OTHER PUBLICATIONS

J & J, Inc. advertisement, Thomas Register of American Manufacturers, 87 ed., vol. 8, Apr. 1997.*
Pipe Flanges and Flanged Fittings (ASME/ANSI B16.5) The American o Mechnical Engineers, 1992.*
*Factory–Made Wrought Steel Buttwelding Fittings (ASME B16.9–1993)*, The American Society of Mechanical Engineers, 1993.
*Annual Book of ASTM Standards (Section 1, vol. 1.01)*, American Society for Testing Animals, 1997.
*Vitaulic: Mechanical Piping Systems General Catalog*, The Vitaulic Company of America, 1988.
*Weldbend*, 10th ed., Weldbend Corporation, 1996.

* cited by examiner

*Primary Examiner*—G. Binda
(74) *Attorney, Agent, or Firm*—Niro, Scavone, Haller & Niro

(57) ABSTRACT

The invention is a piping to component component connector system including forged flange which has a groove and raised portion in place of the conventional weld neck construction. The groove and raised portion allow the flange to be connected to associated piping by mechanical means rather than by welding. Forged flanges, with their high strength and quality, can be employed in piping systems without the attendant high expense of field welding the flange to its associated piping.

14 Claims, 1 Drawing Sheet

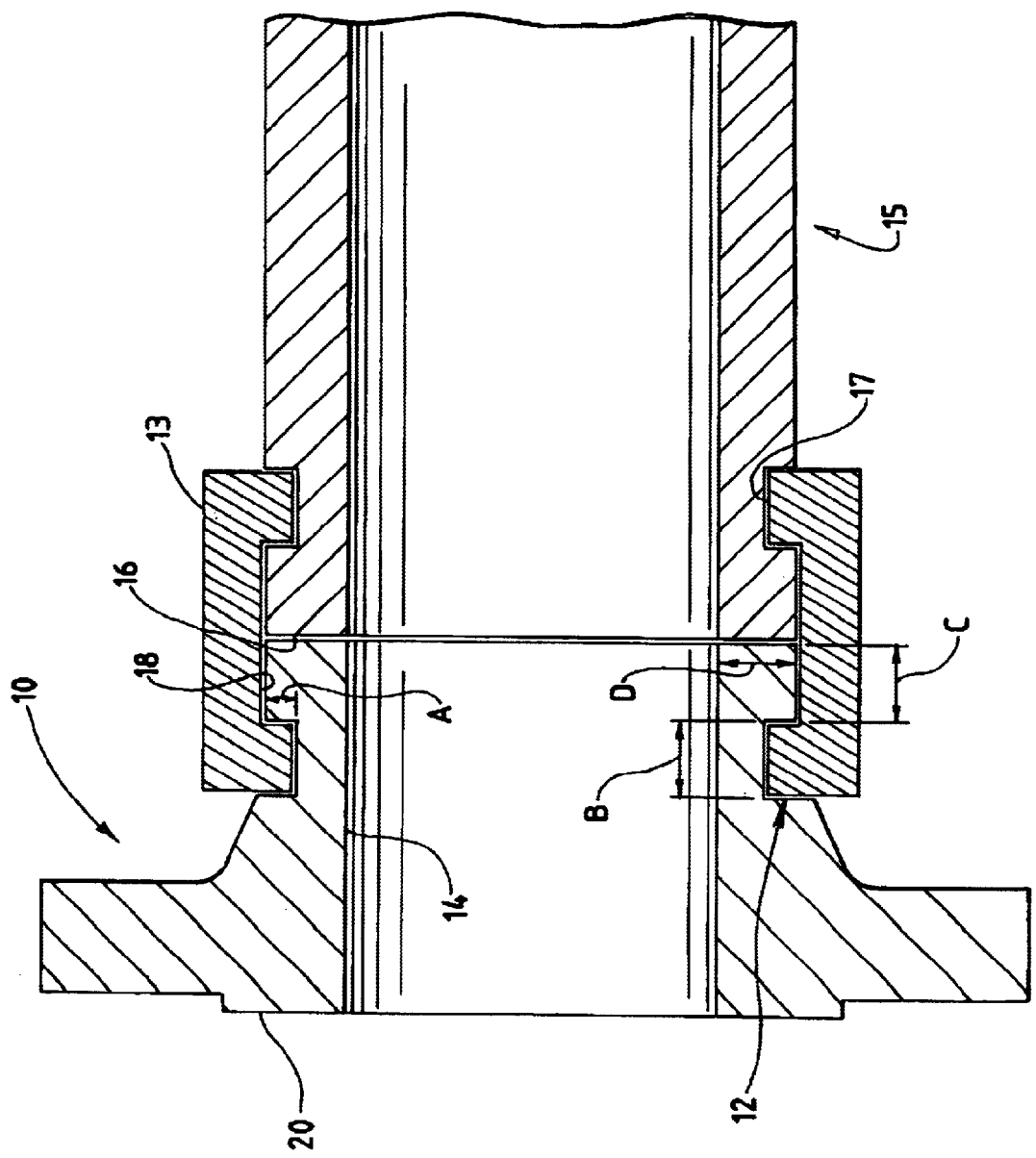

PIPING TO COMPONENT CONNECTOR

BACKGROUND OF THE INVENTION

The present invention relates to flanges for connecting piping to various components such as pumps, valves, tanks, heat exchangers and so forth. Such flanges are preferably made of carbon steel forgings for increased strength and high quality, and can also be forged from other materials, such as stainless steel or metal alloys. Such flanges are typically attached on one side to a section of pipe by means of welding, and on the other side to another flange or piece of equipment by bolts. Connecting the flange and pipe by a welded joint provides a very sturdy, leak-proof high-quality joint, but such welded connections are expensive, particularly if they are made in the field, that is, at the site of the building or facility where the piping system is actually used. Welded joints are considerably less expensive when the welding may be accomplished in a factory where portions of the piping system can be prefabricated in sections which are later taken to the work site and connected together.

While welded connections are required for many high-pressure or high-temperature applications, mechanical connections may be suitable for applications which do not experience high stresses due to either high internal pressures or external loads or both. Examples of such applications are water supply systems, fire protection sprinkling systems, compressed air systems, and any other system limited to reasonably low pressures and not experiencing large temperature variations. Mechanical connections can be made in such systems without any appreciable risk to the integrity of the system. Since these connections do not require welding, they are particularly attractive for use in the field where the piping system is being assembled.

Use of forgings for such flanges offers other advantages, too. Forgings are typically of higher quality than castings. Second, forgings made according to accepted standards carry marking information which can be used to identify the source of the flange and the batch of material from which the forging was made. Finally, use of a forging typically allows a higher pressure rating than is allowable for other materials, such as cast iron.

SUMMARY OF THE INVENTION

The invention includes a flange for connecting a section of pipe to a component, for example, a pump or valve, having another flange. The flange is forged from carbon steel or other suitable materials, thus insuring the high quality of a forged, as opposed to a cast, component. The material of the flange is selected according to established standards for forged flanges. The side of the flange that connects with the component is made in accordance with established standards. The other side of the flange is made with a neck section having a groove so that the flange can be connected to a section of piping by means of a mechanical clamp and gasket.

It is one object of the invention to provide a flange made of forged materials, e.g., carbon steel, that can be mechanically fastened to a section of pipe.

It is another object of the invention to provide a forged flange that requires no welded connections.

DESCRIPTION OF THE DRAWING

The single FIGURE is a side view of a flange made according to the invention.

DETAILED DESCRIPTION OF THE INVENTION

Referring now to the FIGURE, a flange 10 is made of carbon steel in accordance with specification A105, "Standard Specification for Carbon Steel Forgings for Piping Applications," published by the American Society for Testing and Materials, West Conshohocken, Pa. The dimensions of the flange, except where identified below, are selected in accordance with ASME/ANSI Standard B16.5, published by the American Society of Mechanical Engineers, New York, N.Y. The figure shows for convenience a class 150 weld neck flange with a nominal size of three inches. It should be understood, however, that the invention is applicable to all pressure rating classes and nominal sizes from at least one-half inch through twenty-four inches. Employing standardized materials and dimensions insures that the flange can be connected to other components having connections made pursuant to the same standards.

As shown in the FIGURE flange 10 does not have a standard welding end as described in ASME/ANSI B16.5. Instead, the flange 10 has a circumferential groove 12 surrounding a central bore 14 of flange 10. Groove 12 is separated from end 16 of flange 10 by a raised portion 18. A section of pipe 15 shown in the figure as a similar groove 17, also spaced by a similar amount from the end of the pipe and separated from the end of the pipe by a similar raised portion. The pipe 15 is butted against neck end 16 of flange 10. Groove 12 and the similar groove 17 in the pipe 15 can receive a mechanical clamp 13. One suitable clamp may be obtained from the Victaulic Company of America, of Easton, Pa. One suitable clamp may be obtained from the Victaulic Company of America, of Easton, Pa. The mechanical clamp 13 locks the flange and pipe together and may also include a seal to prevent leakage. Thus, flange 10 can be connected to a section of pipe without requiring a welded connection.

In the FIGURE the dimensions of groove 12 are shown for one size, a three-inch standard weight flange. The depth A of groove 12 is 0.078 inches. The width B of groove 12 is 0.255 inches. The length C of raised portion 18 is 0.562 inches. The thickness D of annular end 16 is 0.216 inches. Other flange sizes or weights would of course, have different dimensions. Furthermore, different groove shapes could be employed so long as the associated clamp can mate with the groove and provide an adequate connection.

The opposite end of flange 10 may have a raised portion on a face 20 as shown or the face can be flat, as necessary and according to typical practice.

While the description thus far has focussed on forgings made of carbon steel, it must be realized that the invention is equally applicable to forgings made from other materials, such as stainless steel or alloy materials.

When piping systems are prefabricated by welding in a shop or factory and then transported to the field for erection, welding in the field was also necessary if a carbon steel flange, with its associated high strength and quality was desired. With the invention, however, the desirable characteristics of a forged flange can now be obtained without the need for employing expensive field welding techniques.

I claim:

1. A pipe-to-component connector system, comprising:
   a forged flange;
   a metallic piping segment;
   an extended neck on the flange for abutting the piping segment;
   a circumferential groove in the neck of the flange;

a raised portion separating the groove from one end of the neck of the flange;

a circumferential groove in the piping segment;

the grooves in the flange and piping segment cooperating to receive a clamp to connect and seal the flange and piping segment.

2. The system of claim 1 wherein the flange is made of material selected in accordance with ASTM Standard A1C5.

3. The system of claim 1 wherein the flange face is made in accordance with ASME/ANSI Standard B16.5.

4. The system of claim 1 wherein the cross-section of the groove in the flange is rectangular.

5. The system of claim 1 wherein the cross-section of the grooves in the flange and piping segment are rectangular.

6. The pipe-to-component connector system of claim 1, wherein the circumferential groove in the neck of the flange is in the outer surface of the neck.

7. A pipe-to-component connector system, comprising:.

a forged flange having a face for mating to another flange or fluid-handling equipment;

a rigid piping segment;

an extended neck on the side of the flange away from the face for abutting the piping segment;

a circumferential groove in the outer surface of the neck of the flange;

a circumferential groove in the piping segment;

the grooves in the flange and piping segment cooperating to receive a clamp to connect and seal the flange and piping segment.

8. The system of claim 7 wherein the flange is made of material selected in accordance with ASTM Standard A105.

9. The system of claim 7 wherein the flange face is made in accordance with ASME/ANSI Standard B16.5.

10. The system of claim 7 wherein the cross-section of the groove in the neck is rectangular.

11. The system of claim 7 wherein the cross-section of the grooves in the flange and piping segment are rectangular.

12. A pipe-to-component connector system, comprising:

a forged flange;

a metallic piping segment;

an extended neck on the flange for abutting the piping segment;

a circumferential groove in the neck of the flange;

a raised portion separating the groove from one end of the neck of the flange;

a circumferential groove in the piping segment;

a clamp to connect and seal the flange and piping segment together, the grooves in the flange and piping segment cooperating to receive the clamp.

13. A pipe-to-component connector system, comprising:

a forged flange having a face for mating to another flange or fluid-handling equipment;

a rigid piping segment;

an extended neck on the side of the flange away from the face for abutting the piping segment;

a circumferential groove in the outer surface of the neck of the flange;

a circumferential groove in the piping segment;

a clamp;

the grooves in the flange and piping segment cooperating to receive the clamp to connect and seal the flange and piping segment.

14. An apparatus comprising:

a forged flange consisting of material selected in accordance with ASTM Standard A105, and having a face made in accordance with ASME/ANSI Standard B16.5;

an extended neck on the side of the flange away from the face for abutting a pipe;

a circumferential groove in an outer surface of the neck of the flange;

a segment of pipe for abutting the flange;

an abutment of the pipe and flange;

a circumferential groove in an outer surface of the pipe; and a clamp for connecting the pipe and flange.

\* \* \* \* \*